No. 845,769. PATENTED MAR. 5, 1907.

L. B. ENGELHART.

HOPPLE.

APPLICATION FILED JAN. 8, 1906.

Witnesses:

G. A. Pennington

J. B. Megown.

Inventor:

Louis B. Engelhart,

By Carr & Carr

Attys.

THE NORRIS PETERS CO., WASHINGTON, D. C.

UNITED STATES PATENT OFFICE.

LOUIS B. ENGELHART, OF ST. LOUIS, MISSOURI.

HOPPLE.

No. 845,769. Specification of Letters Patent. Patented March 5, 1907.

Application filed January 8, 1906. Serial No. 295,080.

*To all whom it may concern:*

Be it known that I, LOUIS B. ENGELHART, a citizen of the United States, and a resident of the city of St. Louis and State of Missouri, have invented a new and useful Improvement in Hopples, of which the following is a specification.

Cattle drovers have great difficulty in driving cattle to market by reason of the cattle attempting to run away.

The primary object of the present invention is to facilitate the driving of cattle and other animals by hoppling them with a device that will not interfere materially with their ordinary walk, but will prevent them from running away. It consists in an elongated member adapted to be fastened to the fore leg of the animal so as to swing thereon without interfering with either of the hind legs except when the animal is running, as hereinafter described.

Figure 1:
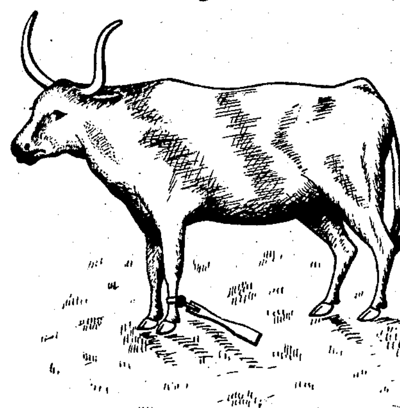
Figure 2:
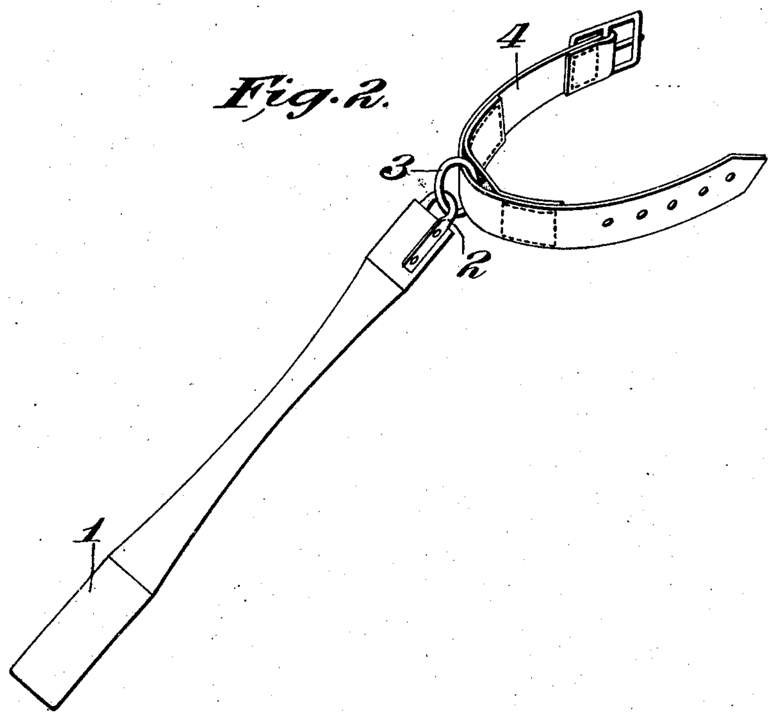

In the accompanying drawing, which forms part of this specification, and wherein like symbols refer to like parts wherever they occur, Figure 1 is a view of my device attached to the leg of an animal, and Fig. 2 is a perspective view of my device.

A thick or stout elongated member 1 has a loop 2 at one end thereof. Engaging said loop 2 is a ring 3, which is secured to a band 4 or other suitable means, whereby it may be secured to the fore leg of a steer or other animal. Said stout elongated member 1 is of such length that when it is fastened to one fore leg and is swung horizontally thereon it will strike the other fore leg of the animal. On the other hand, this stout elongated member is so short that its free or rear end will not interfere with the hind legs of the animal when moving at a walk. The free or outer end of the stout elongated member 1 is made heavy, so that when it is swung by the rapid movement of the animal it will deliver a forcible blow against the fore leg opposite to that upon which it is fastened. It is preferable to make said member of less thickness in the middle portion thereof, so as to permit the hoof of a cloven-footed animal to engage the same when running rapidly. Toward the lower or free end of said member 1 the thickness and weight increase, the thickness of the lower end being preferably about twice that of the middle portion thereof.

The operation of the device is as follows: The stout elongated member 1 is secured to the fore leg of a steer just above the fetlock by means of the strap 4 and normally drags on the ground far enough in front of the hind feet to avoid interfering therewith. The animal is thus free to walk about, but when it runs the member 1 is swung laterally and strikes violently against the fore leg opposite to that to which it is fastened. The stroke is usually delivered against the fore leg while said leg is raised above the ground, and it causes the animal to stumble and fall upon its knees. If the rapid movement of the animal is such as to merely trail the elongated member, the narrow portion of said member will be in position for the hoof of the rapidly-moving animal to step upon. In the case of a cloven-hoofed animal the hoof straddles this narrow portion, whereupon the fore leg pulls the elongated member forwardly, thereby carrying the hind leg into a position where it no longer supports the animal. It is to be noted that on account of the tapering of the narrower portion of the member 1 and the capacity of the members of the hoof for spreading the fall of the animal is somewhat broken.

Obviously divers changes may be made in the construction of my device without departing from my invention, and I do not wish to be limited to the specific construction shown.

What I claim as my invention, and desire to secure by Letters Patent, is—

1. A hopple comprising a band arranged to be secured to the fore leg of an animal, and a stout elongated member swingingly connected thereto, said member being long enough to strike the opposite fore leg of said animal when swung horizontally and being short enough to avoid interference with the hind feet of said animal when moving at a walk, substantially as and for the purpose set forth.

2. A hopple comprising a band adapted to be fastened to a fore leg of an animal, a stout elongated member relatively narrower at its middle part and of increasing thickness toward its free end, and means connecting said band and said member to permit said member to swing in all directions, said member being of such length as to strike the opposite fore leg when swung laterally and being short enough to avoid interference with the hind feet when the animal is walking, substantially as and for the purpose set forth.

3. A hopple comprising a band adapted to be fastened to the fore leg of an animal, a stout elongated member of greater thickness and weight at its outer end, and a ring-and-loop connection between said band and said member, said member being of such length as to strike the opposite fore leg when swung laterally and being short enough to avoid interference with the hind feet when the animal is walking.

In witness whereof I have signed my name to this specification, in the presence of two subscribing witnesses, at the city of St. Louis, Missouri, this 30th day of December, 1905.

LOUIS B. ENGELHART.

Witnesses:
WM. P. CARR,
J. B. MEGOWN.